United States Patent
Finlow-Bates et al.

(10) Patent No.: US 9,471,824 B2
(45) Date of Patent: Oct. 18, 2016

(54) EMBEDDED BARCODES FOR DISPLAYING CONTEXT RELEVANT INFORMATION

(71) Applicant: QUALCOMM Incorporated, San Diego, CA (US)

(72) Inventors: Keir Finlow-Bates, Kangasala (FI); Koushik Annapureddy, Tampere (FI)

(73) Assignee: QUALCOMM Incorporated, San Diego, CA (US)

(*) Notice: Subject to any disclaimer, the term of this patent is extended or adjusted under 35 U.S.C. 154(b) by 63 days.

(21) Appl. No.: 13/941,252

(22) Filed: Jul. 12, 2013

(65) Prior Publication Data
US 2015/0014417 A1   Jan. 15, 2015

(51) Int. Cl.
| | | |
|---|---|---|
| G06K 7/14 | (2006.01) | |
| H04N 21/4722 | (2011.01) | |
| H04N 21/658 | (2011.01) | |
| H04N 21/858 | (2011.01) | |

(52) U.S. Cl.
CPC ........ G06K 7/1447 (2013.01); H04N 21/4722 (2013.01); H04N 21/6581 (2013.01); H04N 21/8586 (2013.01)

(58) Field of Classification Search
CPC ............. G06Q 30/02; G06Q 20/3274; G06Q 20/3276; G06Q 30/0207; G06Q 30/0225; G06Q 10/00; G06Q 10/0639; G06Q 10/10; G06Q 10/101; G06Q 20/18; G06Q 20/20; G06Q 20/204; G06Q 20/3224; G06Q 20/3278
USPC ............. 235/462.01–462.45, 472.01–472.03, 235/375
See application file for complete search history.

(56) References Cited

U.S. PATENT DOCUMENTS

| | | | |
|---|---|---|---|
| 6,538,623 B1* | 3/2003 | Parnian et al. | 345/8 |
| 8,385,590 B1* | 2/2013 | Moorer | H04N 21/44008 382/100 |
| 8,485,428 B1* | 7/2013 | Barker et al. | 235/375 |
| 8,529,409 B1* | 9/2013 | Lesea-Ames | 482/9 |
| 8,813,154 B1* | 8/2014 | Sivertsen | H04N 21/812 235/462.07 |
| 2004/0103023 A1* | 5/2004 | Irwin et al. | 705/14 |
| 2006/0086796 A1 | 4/2006 | Onogi | |
| 2006/0184617 A1* | 8/2006 | Nicholas et al. | 709/203 |
| 2007/0138270 A1* | 6/2007 | Reblin | 235/383 |
| 2008/0244675 A1 | 10/2008 | Sako et al. | |
| 2008/0250122 A1* | 10/2008 | Zsigmond et al. | 709/220 |
| 2009/0010620 A1* | 1/2009 | Hatabu | G09B 5/06 386/239 |

(Continued)

FOREIGN PATENT DOCUMENTS

| | | |
|---|---|---|
| KR | 101081438 B1 | 11/2011 |
| WO | WO-2012120524 A2 | 9/2012 |

OTHER PUBLICATIONS

International Search Report and Written Opinion—PCT/US2014/045264—ISA/EPO—Oct. 14, 2014.

*Primary Examiner* — Thien M Le
(74) *Attorney, Agent, or Firm* — Knobbe, Martens, Olson & Bear LLP

(57) ABSTRACT

Described herein are systems and methods employing embedded barcodes to convey supplemental information about an image, for example a motion picture. In some systems the barcodes may be subliminal because they are spliced, physically or digitally, into a movie frame shown too briefly to be consciously detectable to the human eye, but still detectable by camera sensors. Other described systems may display the barcodes in infrared or ultraviolet light, which is outside of the visible spectrum of light perceived by the human eye, but still detectable by camera sensors.

27 Claims, 8 Drawing Sheets

(56) References Cited

U.S. PATENT DOCUMENTS

| | | |
|---|---|---|
| 2011/0068173 A1 | 3/2011 | Powers et al. |
| 2011/0079639 A1* | 4/2011 | Khan ............................ 235/375 |
| 2011/0145074 A1* | 6/2011 | Polizzotto ................. 705/14.66 |
| 2012/0085820 A1* | 4/2012 | Morgan ........................ 235/375 |
| 2012/0169928 A1 | 7/2012 | Casagrande et al. |
| 2012/0181329 A1 | 7/2012 | Gratton et al. |
| 2012/0246184 A1* | 9/2012 | Rothschild ................... 707/758 |
| 2012/0304224 A1 | 11/2012 | Hines |
| 2012/0325902 A1* | 12/2012 | Goyal et al. ................. 235/375 |
| 2013/0011062 A1 | 1/2013 | Conwell et al. |
| 2013/0054387 A1* | 2/2013 | Holman et al. ................ 705/15 |
| 2013/0079037 A1* | 3/2013 | Dobyns ..................... 455/456.3 |
| 2013/0111208 A1* | 5/2013 | Sabin ....................... G06F 21/35 713/171 |
| 2013/0130785 A1* | 5/2013 | Small .............................. 463/25 |
| 2013/0301870 A1* | 11/2013 | Mow ..................... G06T 1/0021 382/100 |
| 2014/0100935 A1* | 4/2014 | Irish .................... G06Q 30/0207 705/14.26 |
| 2014/0112551 A1* | 4/2014 | Terwilliger .............. G06K 9/00 382/118 |
| 2014/0172531 A1* | 6/2014 | Liberty .............. G06Q 20/3224 705/14.23 |
| 2014/0266639 A1* | 9/2014 | Zises .......................... 340/12.28 |
| 2014/0289134 A1* | 9/2014 | Sutton .......................... 705/300 |
| 2014/0303991 A1* | 10/2014 | Frank ................................ 705/2 |
| 2015/0019321 A1* | 1/2015 | Begum et al. ............. 705/14.38 |
| 2015/0081440 A1* | 3/2015 | Blemaster ................. 705/14.54 |

\* cited by examiner

EMBEDDED BARCODES FOR DISPLAYING CONTEXT RELEVANT INFORMATION

TECHNICAL FIELD

The present embodiments relate to image display systems, and in particular, to systems and methods for embedding supplemental information in an image or video and displaying preferred information to viewers.

BACKGROUND

Many visual presentations, such television shows or movies, include information in addition to the still video images that make up the presentation. In conventional movies, additional information such as subtitles in a variety of languages, director's commentary, closed captioning, or interesting facts may be available for selection through a menu. However, this particular solution may be time consuming and often complex to execute by an average user. Additionally, such menu-oriented systems for presenting supplemental information do not automatically present the viewer with the desired information while the movie is playing. Displaying all additional information at once may clutter the display area and overwhelm a viewer. Accordingly, it can be desirable to provide visual presentation systems which automatically present each user with information relevant to that user.

SUMMARY

The barcode embedding and detection techniques described provide a way to embed supplemental information into a visual presentation, provide the supplemental information to a user device, and display preferred information to the user. The system may include two components, a subliminal frame, or frames, in the visual presentation and a user presentation device which can detect the frame or frames and output information according to user preferences.

The subliminal frames may comprise a barcode, such as a matrix or 2D barcode, which is not visible to the viewer. Some embodiments of the barcodes may be non-visible to the human eye because they are spliced, physically or digitally, into a moving picture frame shown for too brief a time to be detectable to the human eye, though still detectable by a camera sensor. Such barcodes are referred to herein as "subliminal barcodes." Other embodiments may display the barcodes superimposed over the visual presentation in infrared or ultraviolet light, which is outside of the visible spectrum but still detectable by camera sensors. For example, in one embodiment of an embedded subliminal barcode system, a movie may be projected onto a UV or IR reflective surface. Such barcodes are referred to herein as "non-visible barcodes," where the term non-visible denotes that the wavelength of light is outside of the visible spectrum of the typical human eye, though still detectable by a device such as an image sensor. As used herein, the term "imperceptible barcode" may refer to either a subliminal barcode or a non-visible barcode, wherein a user watching a video with an imperceptible barcode would not notice an embedded imperceptible barcode. While a movie viewer would only be aware of the projected movie, a device of the viewer may be configured to detect reflected UV or IR barcodes and would thus be able to provide the viewer with additional information about the movie, though the viewer was unaware of the barcodes.

As described, a personal computing device may store preferences of a viewing user regarding preferred supplemental information, and, upon detection of a barcode in the image using a sensor of the personal computing device, the device may decode the barcode and display any available preferred information to the user. Some embodiments of the personal computing device may comprise a heads-up display (HUD) or head-mounted display (HMD) system for presenting information to the user.

According to an embodiment, an image and information display system may comprise at least one image; at least one barcode, the at least one barcode representing supplemental information about the at least one image, wherein the at least one barcode is configured to be subliminal or non-visible to the human eye; and a personal computing device of a user, the personal computing device comprising a detector configured to detect the at least one barcode, a display portion, and a processor configured to decode the supplemental information, retrieve at least one user information preference, and, if the supplemental information contains information relevant to the at least one user information preference, display the relevant information to the user on the display.

In another embodiment, a method of displaying embedded information, comprises generating at least one barcode representing supplemental information about an image; embedding the at least one barcode into the image, wherein the at least one barcode is embedded subliminally or non-visibly; and displaying the image with the at least one embedded barcode. In further embodiments, the image may be a video comprising a plurality of frames, and embedding the at least one barcode into the image may further comprise splicing the at least one barcode into a barcode frame between a first frame and a subsequent frame of the plurality of frames. In certain embodiments, the at least one barcode may comprise infrared or ultraviolet light, and embedding the at least one barcode into the image may further comprise overlaying at least a portion of the image with the infrared or ultraviolet light.

In yet another embodiment, a method of presenting embedded information to a user may comprise scanning an image with a portable computing device of the user, wherein the image comprises at least one subliminally embedded barcode representing supplemental information about the image; detecting the at least one subliminally embedded barcode; decoding the supplemental information; retrieving at least one user information preference; and comparing the supplemental information to the at least one user information preference; wherein, if the supplemental information contains information relevant to the at least one user information preference, the method further comprises displaying the relevant information to the user on the portable computing device.

In yet another embodiment, a user presentation device for displaying additional information to a user may comprise means for scanning an image, wherein the image comprises at least one subliminally embedded barcode representing supplemental information about the image; means for detecting the at least one subliminally embedded barcode; means for decoding the supplemental information; means for retrieving at least one information preference of a user; means for comparing the supplemental information to the at least one information preference; and means for presenting information to the user, wherein, if the supplemental information contains information relevant to the at least one information preference, the relevant information is presented to the user.

DETAILED DESCRIPTION

Figure 1:
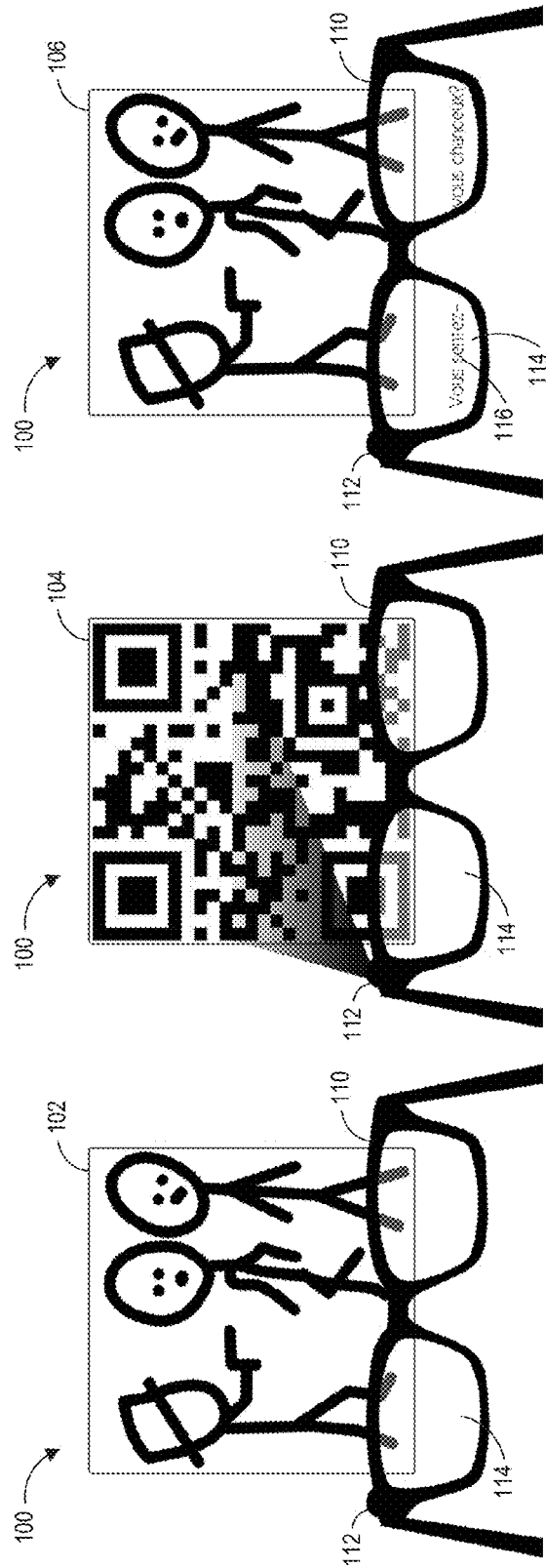
FIGS. 1A-C illustrates an embodiment of supplemental information display system.

One embodiment relates to systems, methods and apparatus for embedding supplemental information in a visual presentation, detecting the supplemental information, and displaying preferred supplemental information to a user. Often, visual presentations, such as movies or television shows, will be provided with optional supplemental information that a viewer may select for display, for example subtitles of a selected language, closed captioning, or director's commentary. However, such systems do not automatically present the additional information desired by the viewer. Thus, some embodiments of the present disclosure provide systems and methods for automatically presenting a viewer with any available desired supplemental information. Particularly, some embodiments described herein relate to a user device which is able to detect subliminal barcodes in a movie, decode the information associated with the barcode, and display at least some of the information based on specified preferences of the viewer. For example, a user may specify that they would like to see French subtitles in movies when French subtitles are available. A movie may be provided with embedded imperceptible barcodes containing extra information about the movie, and when the user's personal computing device detects barcodes containing French subtitle information, the device may display those subtitles to the user.

Some embodiments provide imperceptible barcodes by inserting subliminal barcodes into a moving picture frame, wherein the subliminal barcodes are shown for too brief a time to be detectable to the human eye, for example at at least 24 frames per second. Other embodiments may provide imperceptible barcodes by superimposing non-visible barcodes over the visual presentation, wherein the non-visible barcodes are displayed in ultraviolet or infrared (UV/IR) light, which is not visible to the typical human eye. The visible spectrum, or visible light, is the portion of the electromagnetic spectrum that can be detected by the human eye. A typical human eye will respond to light having wavelengths from approximately 380 to 700 nm. Therefore, as discussed herein, infrared light refers to light having a wavelength longer than that of visible light, or light having a wavelength in the range of approximately 700 nm to 1 mm; ultraviolet light refers to light having a wavelength shorter than that of visible light, or light having a wavelength of approximately 10 nm to 380 nm. Though not perceptible to the human eye, both the quickly-displayed barcode frame and the UV/IR barcodes are detectable by a camera on the user's portable computing device, such as a handheld device or heads-up display.

One skilled in the art will recognize that these embodiments may be implemented in hardware, software, firmware, or any combination thereof. Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Turning now to FIGS. 1A-C, an embodiment of an exemplary supplemental information display 100 is depicted in the context of a motion picture. However, it will be appreciated that such a system 100 could be implemented in any visual presentation, for example television shows, art galleries, museums, video games, or even on product packaging for commercial items. The system 100 comprises a first movie frame 102, a supplemental information frame 104, a second movie frame 106, and a user device 110. The user device 110 comprises an optical sensor 112 and a display 114.

The first movie frame 102, supplemental information frame 104, and second movie frame 106 may be displayed in some embodiments in a movie theater, for example on a projection screen. In other embodiments, the first movie frame 102, supplemental information frame 104, and second movie frame 106 may be displayed on a user device such as a television, computer, tablet, game console, smartphone, etc. The supplemental information frame 104 is illustrated as containing a matrix barcode. Though depicted as a matrix barcode and discussed in the context of barcodes herein, it will be appreciated that the supplemental information may be conveyed by any optically detectable machine-readable representation of data.

Although the user device 110 is depicted as cinema glasses, this is intended for illustrative purposes only and is not intended to limit the types of user devices which may detect subliminal barcodes and present supplemental information to a user. For example, the user device may be a heads-up display (HUD) or head-mounted display (HMD), which may be equipped with a transparent or translucent display element or other means of projecting visual information over the user's field of view. In some embodiments, the user device may be a handheld portable computing device such as a tablet computer, smartphone, personal digital assistant (PDA), or handheld gaming console, or the device may be wearable, such as a watch or a pendant. Such embodiments may employ a screen, such as an LCD or LED screen, to display visual supplemental information to a user, and may further comprise touch-sensitive display technology. Some embodiments of the user device may employ contact lenses with a display element or virtual retinal display to provide information to a user. Further, some embodiments may comprise an auditory element to provide a user with auditory supplemental information, such as a speaker or headphone jack. This may be used, for example, to present an audio stream of director's commentary on a movie. It will be appreciated that user device 110 may be any ubiquitous computing device or augmented reality device capable of information processing and presentation.

The user device 110 may be equipped with an optical sensor 112 configured to detect barcodes, among other visual information. The sensor 112 can be, for example, a charge-coupled device (CCD), a complementary metal-oxide semiconductor (CMOS) sensor, a photodiode, or the like. In some embodiments, the sensor 112 may be incorporated into an image sensing device such as a camera, which may scan images for barcodes. In other embodiments, the sensor may be incorporated into a barcode reader additionally comprising a light source, for example a laser, and the light source may be used to scan images for barcodes. In some embodiments, the light source may comprise ultraviolet or infrared light. In such embodiments, the barcodes may be detectable only by light within the ultraviolet or infrared spectrum and would thus be invisible to the human eye.

The user device 110 may be equipped with additional input devices, for example a wireless network connection or microelectromechanical systems (MEMS) sensors such as a gyroscope, accelerometer, GPS, indoor tracking/positioning system, and solid state compass, which may, in some embodiments, be used in conjunction with or instead of the optical sensor 112 to determine when to display a user with additional information. For example, in one embodiment GPS and/or indoor position coordinates may indicate to the user device that the user is in a movie theater or in front of a movie screen. A solid state compass may indicate when the user turns their head away from the movie screen, or location coordinates may indicate when the user has left the theater, and the device may stop displaying supplemental information when the user is not facing or in front of the movie screen. In another embodiment, an embedded imperceptible barcode supplemental information display system employed in a museum may use location coordinates of pieces of interest to indicate to user device 110 that a barcode containing supplemental information may be present.

In the illustrated example, a user may view a first movie frame 102 through the display 114 of user device 110. As will be discussed in more detail below, a subliminal barcode frame 104 may be presented between the first movie frame 102 and the second movie frame 106. The optical sensor 112 of the user device may scan the subliminal barcode frame 104 and detect the barcode. The user device may decode the information contained in the barcode and present relevant information to the user, for example the subtitles 116 presented on the display 114.

Figure 2:
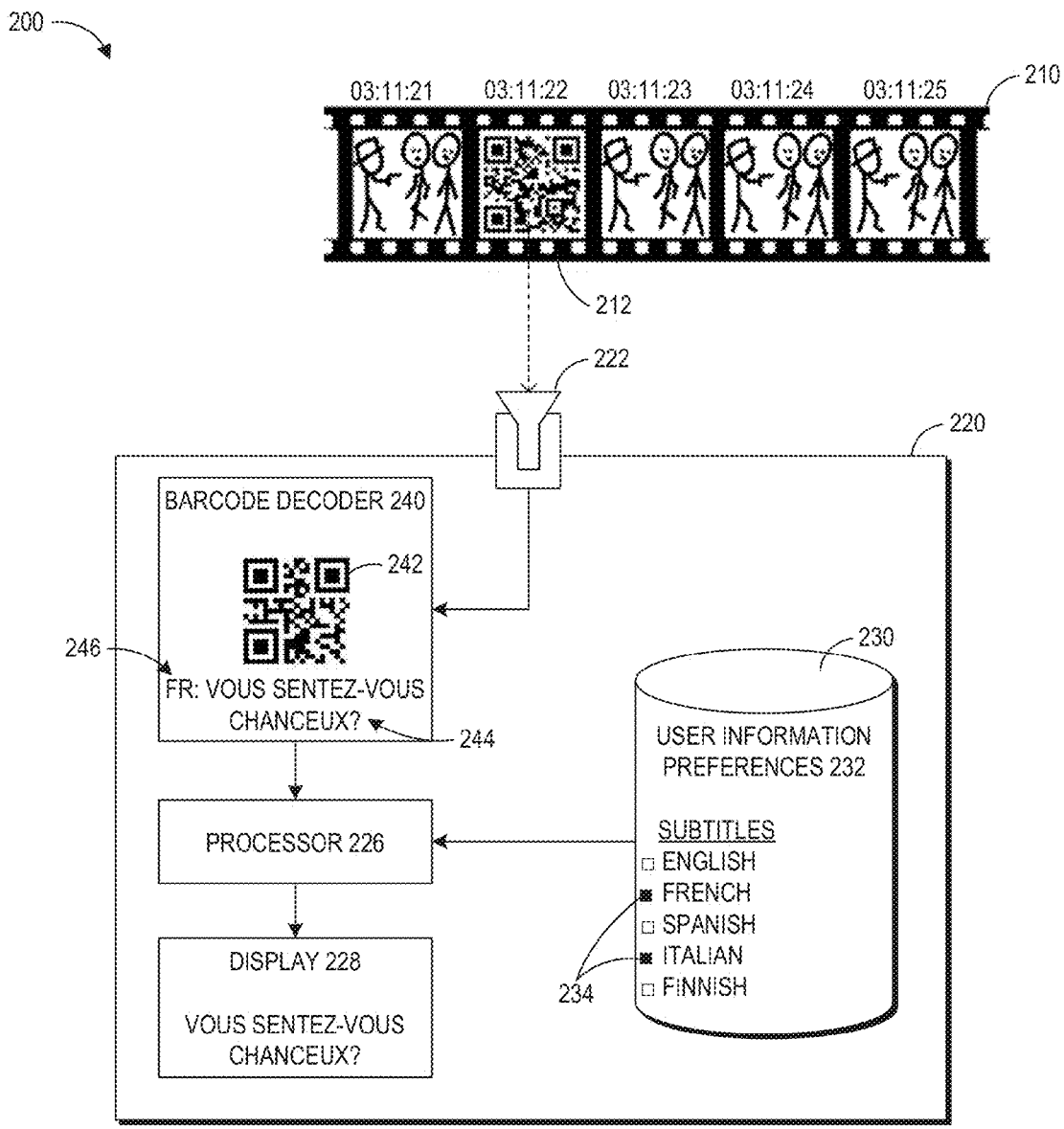
FIG. 2 illustrates another embodiment of supplemental information display system.

Referring now to FIG. 2, a high-level block diagram of an embodiment of a personalized supplemental information display system 200 will now be described in greater detail. As shown in FIG. 2, a supplemental information display system 200 comprises a visual presentation 210 and a user device 220. The visual presentation 210 may be, as illustrated, a motion picture, and may comprise one or more subliminal barcode frames 212. Though discussed in the context of subliminal barcodes, it will be appreciated that the system 200 may operate with non-visible barcodes as well. The user device 220 may comprise an optical sensor 222, a barcode decoder 240, a processor 226, a display 228, and a data store 230.

The subliminal barcode frame 212 may comprise a barcode containing supplemental information about the motion picture 210. As will be described in more detail below, in some embodiments the subliminal barcode frame 212 may be visible but spliced in between frames and displayed too briefly to be detected by the human eye. In other embodiments, the subliminal barcode frame 212 may be embedded in one or more frames of the motion picture 210 but may comprise infrared or ultraviolet light and therefore be undetectable by the human eye. However, the optical sensor 222 of the user device 220 may be configured to detect the subliminal barcode frame 212 even when it is not visible to the human eye.

Data representing the barcode in the subliminal barcode frame 212 may be passed from the optical sensor 222 to the barcode decoding module 240. For example, the sensor may capture an image of the barcode comprising an array of pixels. A data stream representing the array of pixels may be transmitted to the barcode decoding module 240. In the barcode decoding module 240, a type of barcode present in the subliminal barcode frame 212 may be recognized, for example a matrix barcode. In some embodiments, one or more processes such as denoising, grayscale extraction, adaptive brightness equalization, and binarization of pixel values may be carried out on the captured image of the barcode prior to decoding the barcode. The barcode 242 may be decoded by known decoding techniques for example feature or pattern identification, extracting a bitmap from the barcode, and code word extraction.

In some embodiments, the information contained in the barcode 242 may comprise the available supplemental information 244 for potential display to a user. The supplemental information 244 may be encoded in the barcode 242 together with header information 246 identifying the type or types of supplemental information contained in the barcode 242, so that upon decoding the information, the user device 220 may quickly identify the type of supplemental information available for display. The supplemental information may also be associated with display information, for example an audio file or a specified duration for displaying subtitles. In other embodiments, the barcode 242 may contain a link or pointer to a location where the supplemental information may be obtained. For example, user device 220 may further comprise a wireless communication means such as WiFi, Bluetooth, or access to a telecommunications network. The barcode may be decoded to reveal a hyperlink to an Internet-based data store of supplemental information, and the user device 220 may access the data store via the wireless communication means.

The supplemental information 244 may comprise any information relating to the visual presentation 210. Although only one piece of supplemental information 244 is illustrated, it will be appreciated that this is for clarity of illustration and that a barcode may be encoded with a large amount of supplemental information. However, a user may be overwhelmed if all available supplemental information is presented at once. Therefore, after the contents of the barcode are decoded, the decoded supplemental information is passed to the processor 226. The processor 226 compares the types of available supplemental information which has been decoded with user preferences. If there is a match, then the available and preferred information is sent to the display module 228 for presentation to the user.

The display 228 of the user device 220 may be used to present supplemental information to the user. For example, in the illustrated embodiment the matrix barcode has been decoded to reveal French subtitles, and the user information specifies that the user desires to see French subtitles. Therefore, "Vous sentez-vous chanceux?" will be displayed to the user. In some embodiments, the display 228 may be a visual display such as an LCD or LED screen, a HUD display panel, holographic display, or the like. In other embodiments, the display 228 may be an auditory display such as an audio stream transmitted through a speaker or headphones. Tactile means conveying information to a user may be employed as well, for example a refreshable braille display. A combination of display means may be employed by some embodiments of the user device 220. The display 228 may be static or may be configured to present changing information according to the contents of the barcode 242.

Data store 230 may be used to store the user information preferences. For instance, user information preferences may comprise subtitles in a plurality of languages, and one or more languages may be selected 232 as desired information. Although not illustrated, user information preferences in the context of a motion picture may also specify what, if any, information is desirable to display with respect to director's commentary, closed captioning, supplemental character information, actor biographies, etc. Data store 230 may be incorporated into the user device 220 or may be stored remotely in a network accessible by the user device 220.

In some embodiments, the display 228 may also be used to present a user interface in which the user may make selections regarding types of desired supplemental information. The preference specification user interface may be presented, for example, upon the user opening a software application or when the user device 220 detects a subliminal barcode. In some embodiments, the device 220 may determine that the user is at a theater, and the user may be prompted at the beginning of a motion picture to specify preferences regarding desired available information. In some embodiments, the user may specify a set of desired supplemental information to be displayed at any future time. Whenever the device 220 detects a subliminal barcode containing specified desired information, the device 220 may display such information to the user.

Figure 3:
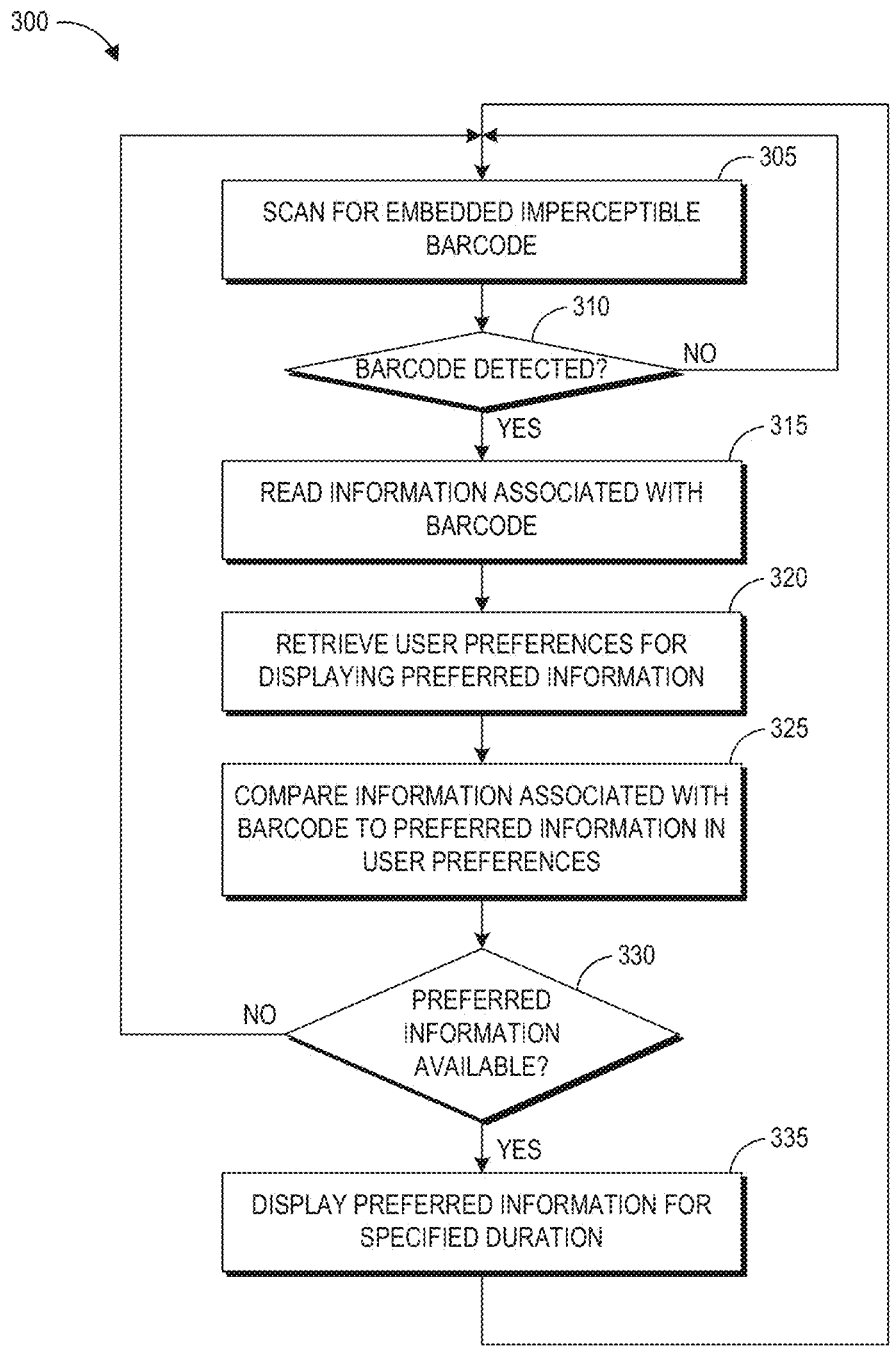
FIG. 3 illustrates an embodiment of a supplemental information display process.

FIG. 3 depicts an embodiment of a supplemental information display process 300 which may be carried out in the portable computing devices 110 and 220 of FIGS. 1A-C and 2. The process 300 begins at step 305 in which the portable computing devices scans for an embedded imperceptible barcode. As previously discussed, an imperceptible barcode is unnoticeable by a viewing user, but may be detectable by a computing device of the user. For example, the optical sensors 112 and 222 described above with respect to FIGS. 1A-C and 2 may be used to carry out step 305 in some embodiments. At step 310, if a barcode is not detected then the process 300 loops back to step 305 to scan for an embedded barcode. In order to detect all available embedded barcodes, some embodiments the process 300 may continuously or periodically execute step 305 even while other steps of the process 300 is being carried out.

If, at step 310, a barcode is detected, then the process 300 transitions to step 315 in which the portable computing device reads information associated with the barcode. In some embodiments this may be carried out by the barcode decoding module 240 of FIG. 2. In embodiments in which the barcode is decoded to contain a pointer or link identifying a location of a data store of supplemental information, step 315 may further comprise accessing the identified supplemental information database. The process 300 then moves to step 320 in which user preferences for displaying supplemental information are retrieved. For example this may be accomplished by accessing the data store 220 of FIG. 2. At step 325, the process 300 compares the information decoded from the barcode with the user preferences, for instance by using the processor 226 of FIG. 2.

At step 330, the process 300 determines whether preferred information is available in the supplemental information decoded from the barcode. If no preferred information is available, the process 300 loops back to step 305 to scan for a new embedded imperceptible barcode. If preferred information is available, then the process 300 transitions to step 335 in which the preferred information is presented to the user for a specified duration. For example, the information may comprise a subtitle and may be specified for display for the duration of some portion of dialogue.

After completing the step 335 of displaying preferred information to a user, the process 300 loops back to step 305 to scan for further embedded imperceptible barcodes. In some embodiments, the process 300 may continue looping back to step 305 for a specified duration, for example the length of a movie. In certain embodiments, the process 300 may continue as long as a supplemental information display program or application is open on the user device. In other embodiments a user device may be configured to execute the process 300 whenever it is powered on.

Figure 4A:
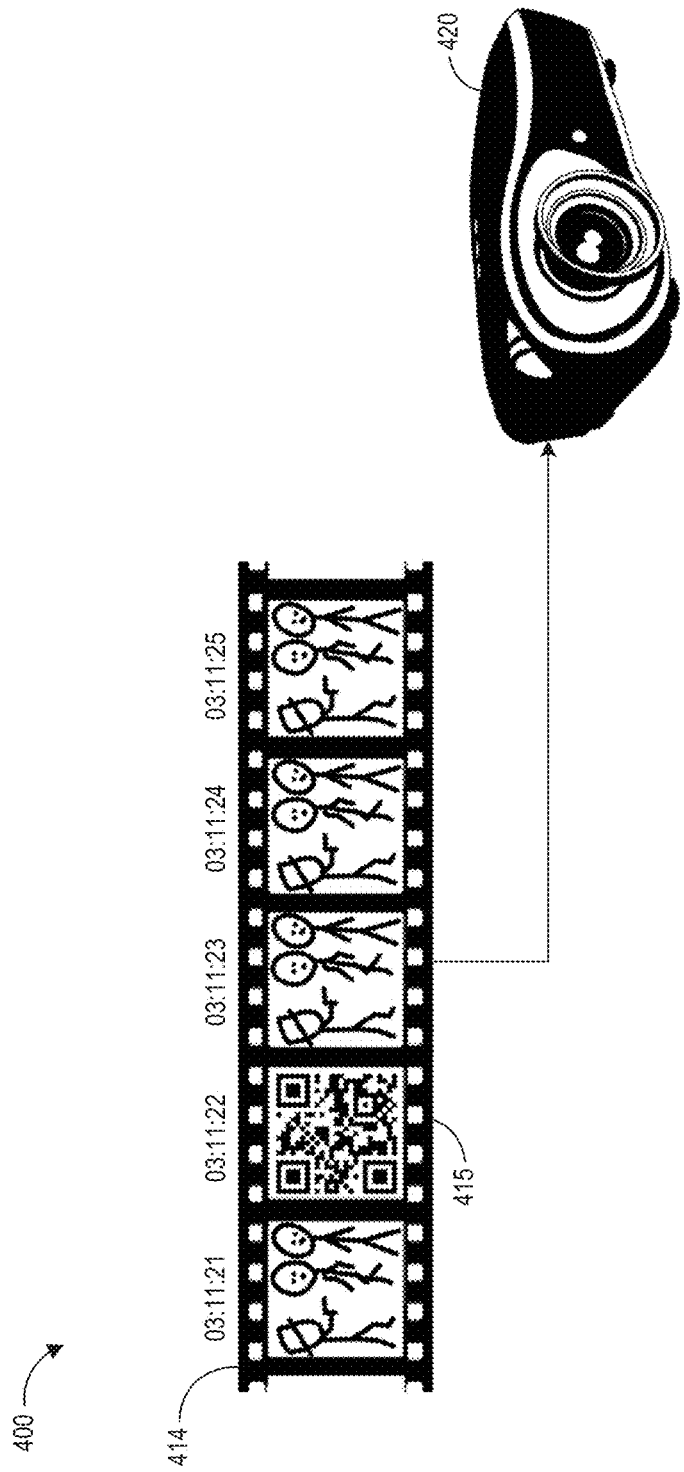
FIGS. 4A-D illustrates various embodiments of moving picture display systems with embedded imperceptible barcodes.

Various embodiments of moving picture display systems 400 with embedded imperceptible barcodes will now be described with greater detail with respect to FIGS. 4A-D. FIG. 4A illustrates an embodiment in which a barcode frame 415 has been spliced between frames in a movie 414. For example, a barcode frame may be physically spliced between frames in cellulose film. Although the movie 414 is pictured as comprising a series of frames on physical film, it will be appreciated that the movie may also be a digital file comprising a plurality of frames. The barcode frame 415 may be digitally spliced between frames of a digital movie file. The movie 414 containing at least one spliced barcode 415 is then sent to a projector 420 for display. The movie 414 may also be stored as a digital file for playback on an electronic display.

Figure 4B:
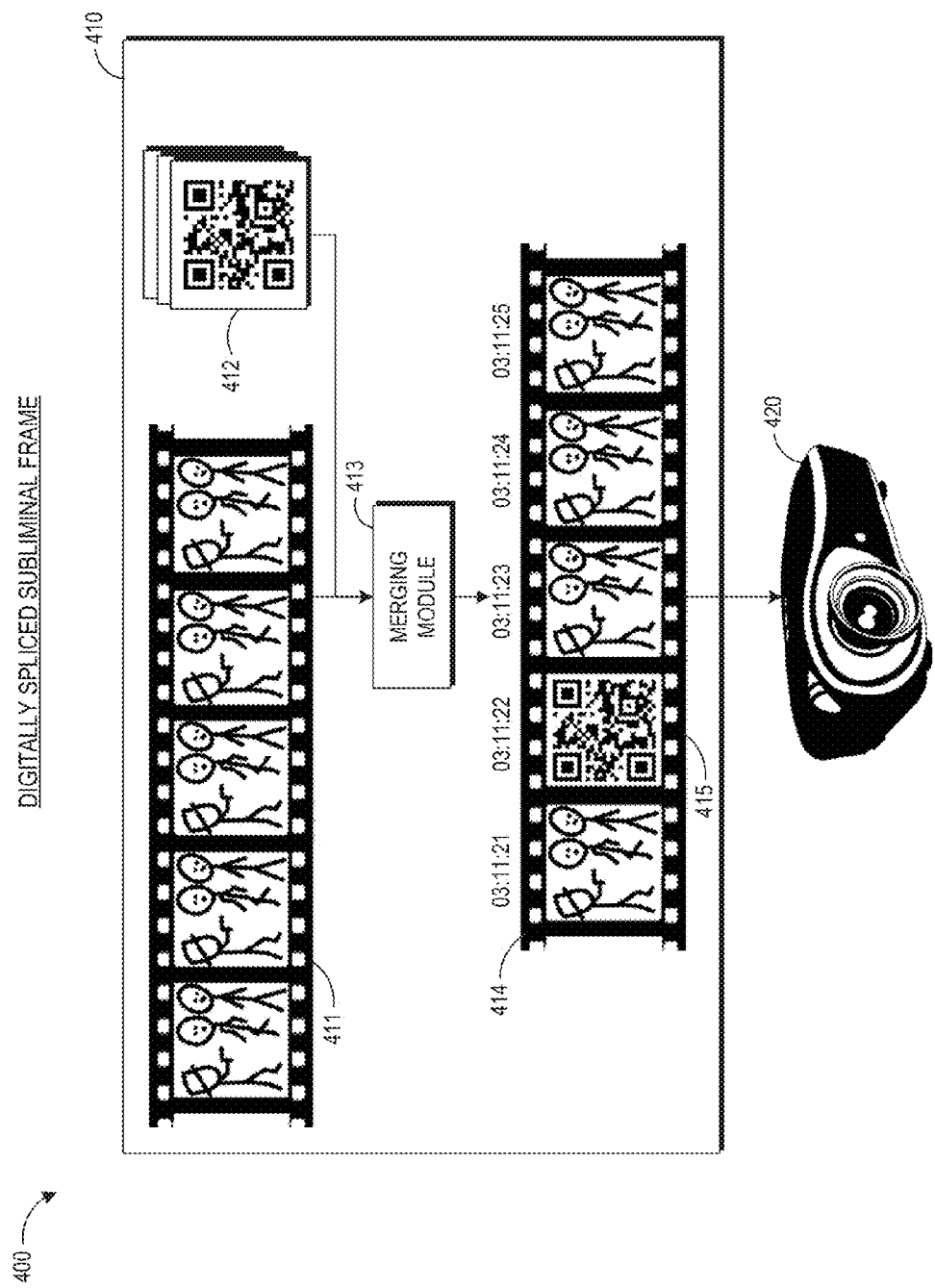

FIG. 4B illustrates an embodiment in which a barcode insertion system 410 communicates with the projector 420. Some embodiments of barcode insertion system 410 may provide subliminal barcodes by inserting the barcodes into a moving picture frame shown for too brief a time to be detectable to the human eye, for example at a rate of at least 24 frames per second. The barcode insertion system 410 may be part of a computing device. The barcode insertion system 410 may comprise a data store (not illustrated) configured to store a movie file 411 as well as at least one barcode 412. The movie file 411 and at least one barcode 412 may be sent to a merging module 413. The merging module 413 may insert the at least one barcode 412 between the relevant frames in the movie 411, creating a second movie file 414 with at least one spliced barcode 415. In some embodiments, the barcode insertion may occur in real-time during the display of the movie. In other embodiments the barcode insertion may occur in advance of a movie showing and a data file comprising the second movie file 414 with at least one spliced barcode 415 may be digitally stored for later playback. The barcode insertion system 410 may send the second movie file 414 to the projector 420 or another display device.

Figure 4C:
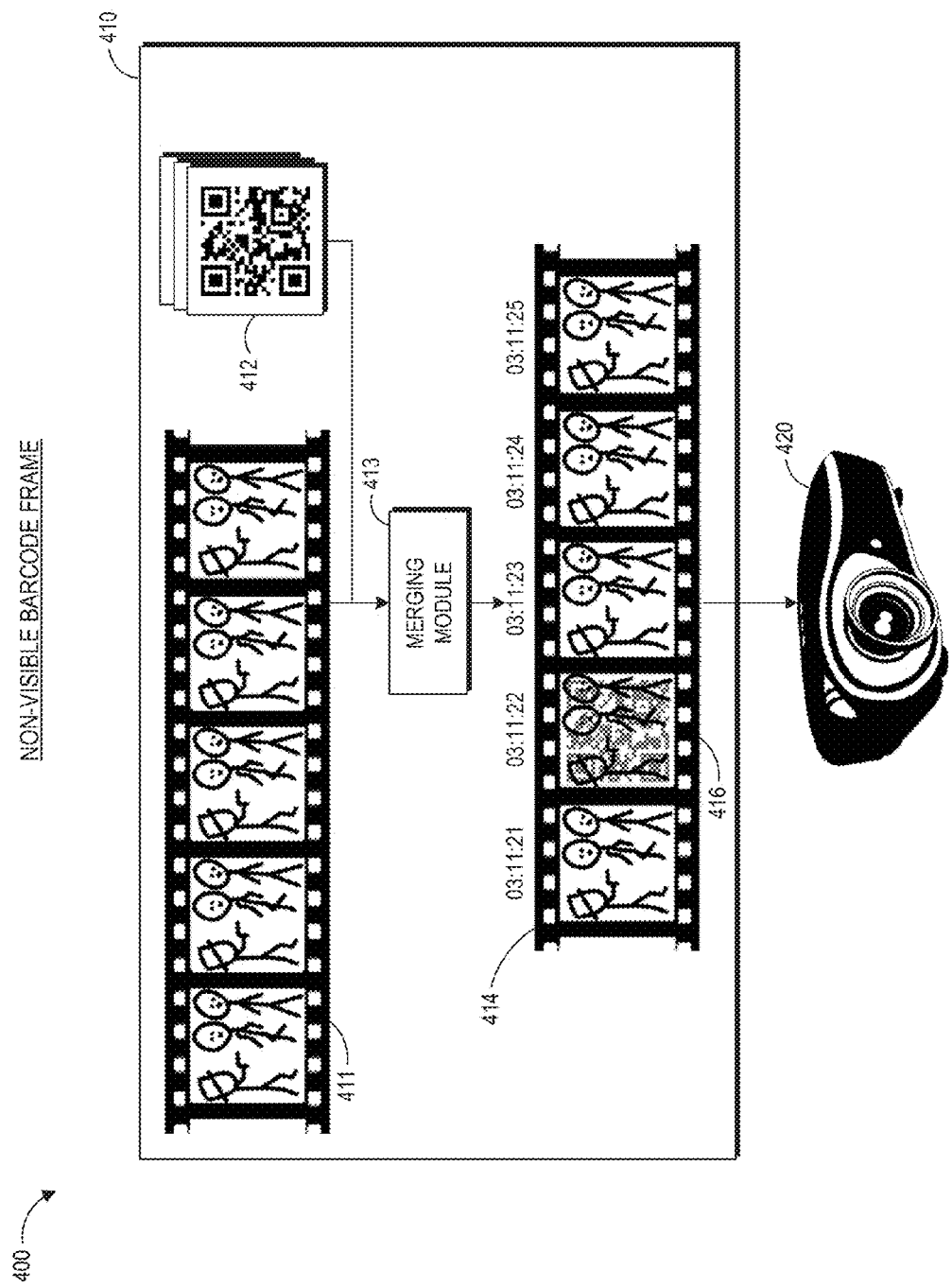

FIG. 4C illustrates another embodiment in which a barcode insertion system 410 communicates with the projector 420. The barcode insertion system 410 may provide non-visible barcodes, e.g. UV or IR barcodes. The barcode insertion system 410 may be part of a computing device. The barcode insertion system 410 may comprise a data store (not illustrated) configured to store a movie file 411 as well as at least one barcode 412. The movie file 411 and at least one barcode 412 may be sent to a merging module 413. The merging module 413 may be configured to embed the at least one barcode 412 in the relevant frames in the movie 411, for example by overlaying the barcode 412, creating a second movie file 414 with at least one embedded imperceptible barcode 416. As discussed above, the barcode embedding may occur in real-time during the display of the movie or in advance of a movie showing. The barcode insertion system 410 may send the second movie file 414 to the projector 420 or another display device configured to display both visible images and UV/IR barcodes.

Figure 4D:
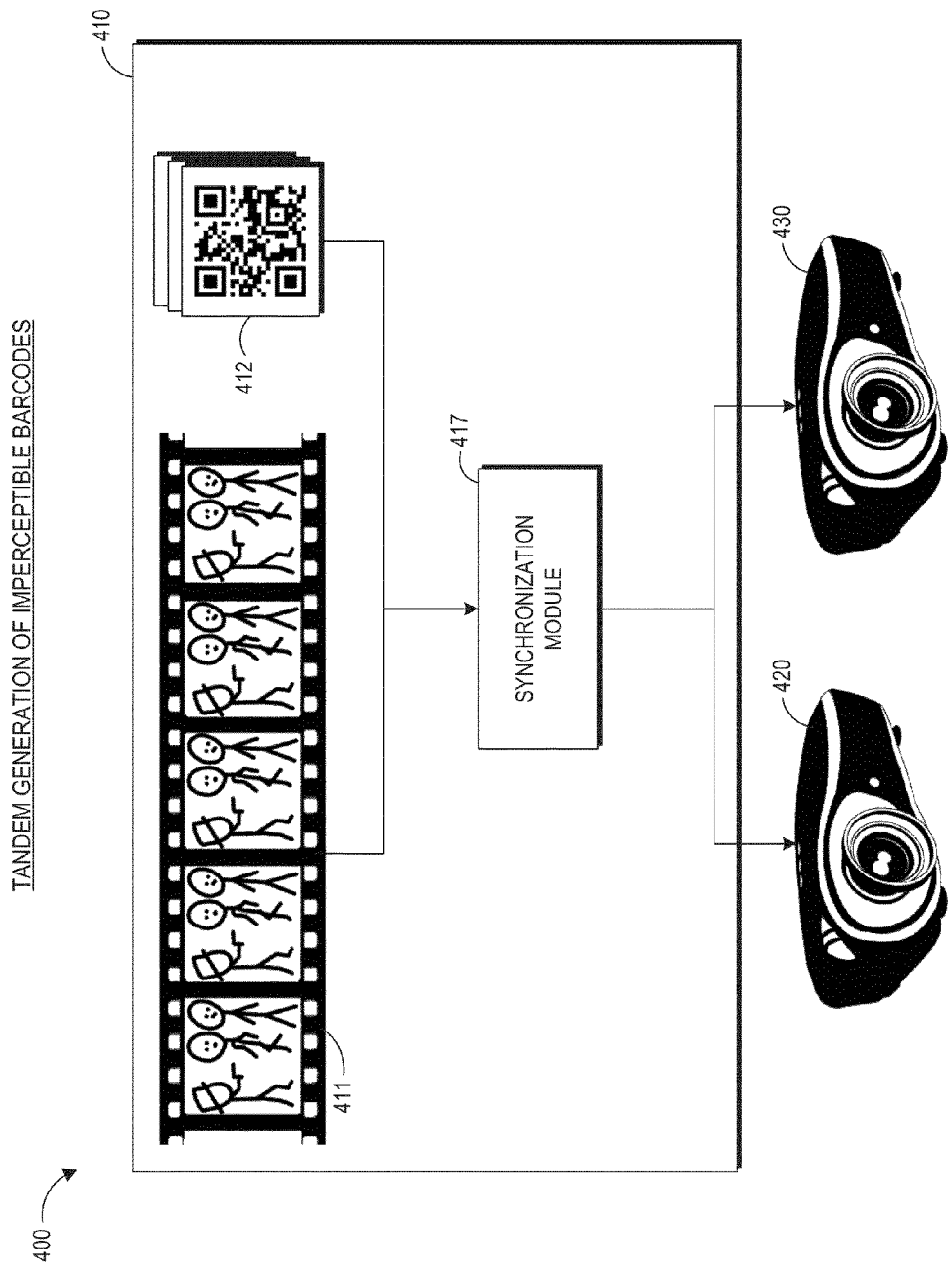

FIG. 4D illustrates another embodiment in which a barcode insertion system 410 communicates with the projector 420. Similar to the embodiment illustrated in FIG. 4C, this embodiment may provide non-visible barcodes, e.g. UV or IR barcodes. The embodiment of FIG. 4D may also provide subliminal barcodes. A movie file 411 and at least one barcode 412 may be passed to a synchronization module 417. The synchronization module may store the movie file 411 and at least one barcode 412 and send them to a movie projector 420 and a UV/IR barcode projector 430, respectively.

Figure 5:
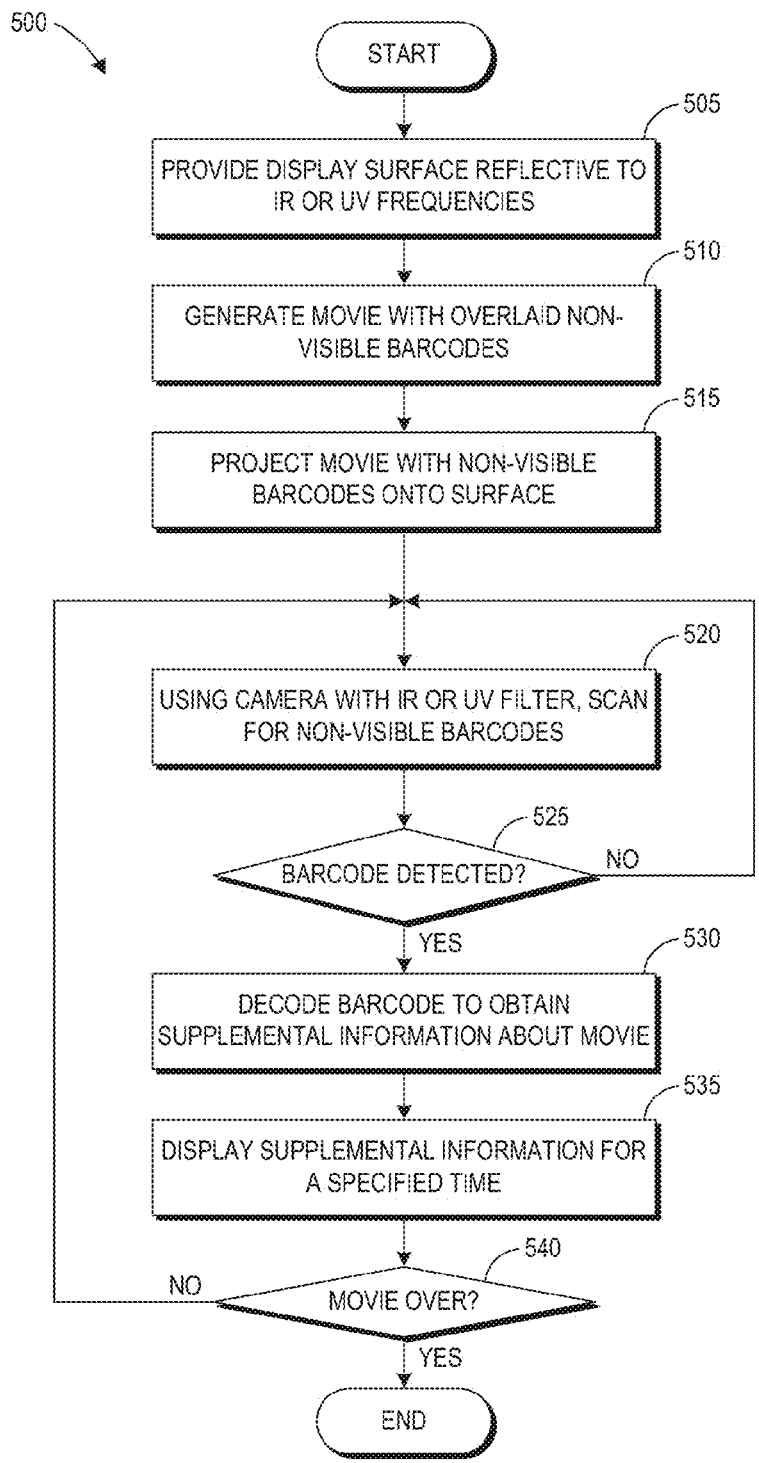
FIG. 5 illustrates an embodiment of infrared non-visible barcode display and detection process.

An embodiment of non-visible barcode display and detection process 500 will now be described with greater detail with respect to FIG. 5. The process 500 may be carried out using moving picture display systems such as described with respect to FIGS. 4C and 4D above.

The process 500 beings at step 505, in which a display surface reflective to IR and/or UV frequencies of light is provided, dependent upon the frequency of light which will be used to display non-visible barcodes. The surface may also have material properties which are conducive to high-quality display of a movie in the visible spectrum of light. The process 500 then transitions to step 510 in which a movie overlaid with non-visible barcodes is generated, for example by the barcode insertion system 410 of FIGS. 4C-D described above. At step 515, the movie generated in step 510 is projected onto the surface provided in step 505. Step 515 may be executed throughout the remainder of the process 500, as the barcode detection steps 520 through 535 are carried out during playback of the movie projected in step 515.

At step 520, a camera with an IR or UV filter scans the surface for barcodes. The camera may be the optical sensors 112 and 222 described above in FIGS. 1 and 2. If, at step 525, a barcode is not detected, then the process 500 loops back to step 520 to scan for barcodes. If, at step 525, a barcode is detected, then the process 500 moves to step 530 in which the barcode is decoded to obtain supplemental information about the film. For example, the decoding may be carried out by the barcode decoder 240 of FIG. 2 as described above. Next, at step 535, any relevant available supplemental information is displayed for a specified period of time. The process 500 then moves to step 540 in which it is determined whether the movie is over. If the movie is not over, the process 500 loops back to step 520 to scan for additional barcodes. If, at step 540, it is determined that the movie is over, then the process 500 ends.

Though discussed primarily within the context of motion pictures herein, it will be appreciated that the use of UV or IR barcodes to convey information has a wide range of applications in other contexts. The example of barcodes superimposed over motion picture frames is intended to illustrate and not limit the use of such barcodes. For example, UV/IR barcodes may be used to convey additional information about still images, groceries, commercial products, books, etc. Museums or art galleries may benefit from the use of UV/IR barcodes superimposed over items of interest, such as on a protective glass or acrylic panel, to provide viewers with supplemental information about the items of interest. In such other contexts, a viewer's device may be configured to detect and decode the barcode and provide relevant supplemental information according to user preferences, as described above.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as a Pentium® processor, a Pentium® Pro processor, a 8051 processor, a MIPS® processor, a Power PC® processor, or an Alpha® processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system may also be written using interpreted languages such as Perl, Python or Ruby.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A system for displaying information to a user, comprising:
   an optical sensor configured to detect an optical imperceptible barcode embedded into a video file, the optical imperceptible barcode unnoticeable by a human eye viewing the video file and detectable by the optical sensor; and
   a processor coupled to the optical sensor and configured to:
      recognize the optical imperceptible barcode,
      decode supplemental information associated with the optical imperceptible barcode,
      access data representing a user information preference,
      compare the supplemental information with the user information preference, and
      in response to determining that the supplemental information matches the user information preference, display at least a portion of the supplemental information to the user.

2. The system of claim 1, wherein the optical imperceptible barcode comprises one of a subliminal barcode and a non-visible barcode.

3. The system of claim 1, wherein the optical imperceptible barcode comprises a non-visible barcode, and wherein the non-visible barcode comprises one of ultraviolet and infrared light.

4. The system of claim 3, wherein the ultraviolet or infrared light is superimposed over at least a portion of the video file.

5. The system of claim 1, wherein the optical imperceptible barcode comprises a subliminal barcode, wherein the video file comprises a plurality of frames, and wherein the subliminal barcode is spliced into a barcode frame between a first frame and a subsequent frame of the plurality of frames.

6. The system of claim 5, wherein the subliminal barcode is physically spliced between a first frame and the next frame.

7. The system of claim 5, wherein subliminal barcode is digitally spliced between the first frame and the subsequent frame.

8. The system of claim 5, wherein the barcode frame is displayed while the video is being displayed at 24 frames per second or more.

9. The system of claim 1, wherein the supplemental information comprises one or more of subtitles, closed captioning, and director's commentary.

10. The system of claim 1, wherein the user information preference comprises a subtitles language preference.

11. The system of claim 1, wherein the system comprises heads-up display glasses or a head-mounted display.

12. The system of claim 1, wherein the system comprises a wireless phone.

13. A method of displaying embedded information from a video file, comprising:
   displaying the video file with an embedded optical imperceptible barcode to a user, wherein the optical imperceptible barcode represents supplemental information about an image, the optical imperceptible barcode unnoticeable by a human eye viewing the video file and detectable by the optical sensor;
   detecting the embedded optical imperceptible barcode;
   decoding the supplemental information;
   retrieving a user information preference;
   comparing the supplemental information with the user information preference; and
   in response to determining that the supplemental information matches the user information preference, displaying at least a portion of the supplemental information to the user.

14. The method of claim 13, wherein the optical imperceptible barcode comprises one of a subliminal barcode and a non-visible barcode.

15. The method of claim 13, the image comprising a video comprising a plurality of frames, wherein the optical imperceptible barcode comprises a subliminal barcode spliced into a barcode frame between a first frame and a subsequent frame of the plurality of frames.

16. The method of claim 15, wherein displaying the image with the embedded optical imperceptible barcode further comprises displaying the barcode frame at a rate of at least 24 frames per second.

17. The method of claim 13, wherein the optical imperceptible barcode comprises a non-visible barcode comprising infrared or ultraviolet light, wherein the non-visible barcode overlays at least a portion of the image with the infrared or ultraviolet light.

18. A non-transitory computer-readable medium storing instructions which, when executed, cause a processor to:
   scan an image, wherein the image comprises an embedded imperceptible barcode representing supplemental information about the image, the embedded imperceptible barcode unnoticeable by a human eye viewing the video file and detectable by the optical sensor;
   detect the embedded imperceptible barcode;
   decode the supplemental information;
   retrieve a user information preference;
   compare the supplemental information with the user information preference; and
   in response to determining that the supplemental information matches the user information preference, cause at least a portion of the supplemental information to be presented to the user.

19. The non-transitory computer-readable medium of claim 18, wherein the processor further configures a display to present the relevant information to the user.

20. The non-transitory computer-readable medium of claim 18, wherein the processor further configures an auditory element to present the relevant information to the user.

21. A user presentation device for displaying additional information to a user, the user presentation device comprising:
   means for scanning a video file comprising embedded imperceptible barcodes representing supplemental information about the image;
   means for detecting an embedded imperceptible barcode, the embedded imperceptible barcode unnoticeable by a human eye viewing the video file and detectable by the optical sensor;
   means for decoding the supplemental information represented by the barcode;

means for retrieving an information preference of a user and comparing the supplemental information to the information preference;

means for comparing the supplemental information with the user information preference; and means for presenting at least a portion of the supplemental information to the user in response to the supplemental information matching with the user information preference.

22. The user presentation device of claim 21, wherein the means for scanning an image comprises one or more of a camera or a light source.

23. The user presentation device of claim 21, wherein the means for detecting the embedded imperceptible barcode comprises one or more of a charge-coupled device (CCD) or a complementary metal-oxide semiconductor (CMOS), and a photodiode.

24. The user presentation device of claim 21, wherein the means for presenting information to the user comprises an LCD, LED, or touch-sensitive screen.

25. The user presentation device of claim 21, wherein the means for presenting information to the user comprises a heads-up display (HUD) or head-mounted display (HMD).

26. The user presentation device of claim 25, wherein the heads-up display (HUD) or head-mounted display (HMD) comprises a means for projecting the relevant information across at least a portion of a field of view of the user.

27. The user presentation device of claim 21, wherein the means for presenting information to the user comprises at least one of an audio speaker and a headphone jack.

* * * * *